(12) United States Patent
Owens et al.

(10) Patent No.: US 7,775,120 B2
(45) Date of Patent: Aug. 17, 2010

(54) ELECTROMECHANICAL ACTUATOR TEST APPARATUS

(75) Inventors: Kevin Eugene Owens, Glendale, AZ (US); Robert Jay Blome, Chandler, AZ (US); Dwayne M. Benson, Chandler, AZ (US); Steven Talbert Forrest, Phoenix, AZ (US); James Neil Quitmeyer, Chandler, AZ (US); Hugh Scott McDowell, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 49 days.

(21) Appl. No.: 12/236,345

(22) Filed: Sep. 23, 2008

(65) Prior Publication Data

US 2010/0071452 A1    Mar. 25, 2010

(51) Int. Cl.
*G01M 19/00*    (2006.01)
(52) U.S. Cl. .................... 73/777; 73/118.01; 73/780
(58) Field of Classification Search ............ 73/777, 73/779
See application file for complete search history.

(56) References Cited

U.S. PATENT DOCUMENTS

| | | | |
|---|---|---|---|
| 3,713,330 A | 1/1973 | Lentz | |
| 4,182,190 A | 1/1980 | Huber et al. | |
| 4,235,103 A | 11/1980 | Carter et al. | |
| 4,435,979 A * | 3/1984 | Gilgore | 73/168 |
| 4,466,294 A | 8/1984 | Bennington et al. | |
| 4,537,077 A * | 8/1985 | Clark et al. | 73/665 |
| 4,602,555 A * | 7/1986 | Bushey | 92/61 |
| 4,658,656 A | 4/1987 | Haeg | |
| 4,758,967 A | 7/1988 | Shmuter et al. | |
| 4,768,391 A * | 9/1988 | Hayes | 73/865.9 |
| 4,782,292 A | 11/1988 | Gilfoy et al. | |
| 5,337,262 A | 8/1994 | Luthi et al. | |
| 5,454,273 A | 10/1995 | Smith | |
| 6,247,366 B1 * | 6/2001 | Porter | 73/571 |
| 6,530,272 B2 | 3/2003 | Uchida et al. | |
| 6,671,641 B1 | 12/2003 | Collins et al. | |
| 7,080,565 B2 | 7/2006 | Delair et al. | |
| 7,254,995 B2 * | 8/2007 | Leska et al. | 73/146 |
| 7,509,882 B2 * | 3/2009 | Monteiro et al. | 73/862.046 |
| 2007/0089498 A1 * | 4/2007 | Su et al. | 73/105 |
| 2008/0034885 A1 | 2/2008 | Monteiro et al. | |

* cited by examiner

*Primary Examiner*—Lisa M Caputo
*Assistant Examiner*—Freddie Kirkland, III
(74) *Attorney, Agent, or Firm*—Ingrassia Fisher & Lorenz, P.C.

(57) ABSTRACT

An electromechanical actuator test system includes an inertia simulator, a first load actuator, a second load actuator, and a test system control. The inertia simulator simulates the inertia of at least a portion of a system that is moved by a test actuator. The first load actuator supplies a first load to the inertia simulator to simulate at least one or more dynamic system loads, and the second load actuator supplies a second load to the inertia simulator to simulate at least one or more steady-state system loads. The test system control supplies the first actuator commands and the second actuator commands.

20 Claims, 3 Drawing Sheets

ELECTROMECHANICAL ACTUATOR TEST APPARATUS

TECHNICAL FIELD

The present invention generally relates to electromechanical actuator (EMA) testing and, more particularly, to an apparatus to test one or more EMAs.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. More recently, as systems are being designed to rely more on electrical power and less on pneumatic or hydraulic fluid power, electromechanical actuators (EMAs) are more often being used. An EMA typically includes an electric motor that, when properly energized, will supply a torque to a suitable actuation device, which in turn positions a component.

The systems that include EMAs are being designed to exhibit relatively high frequency responses and increased slew rates. Moreover, in some applications such as, for example, aircraft flight surface control systems and missile thrust vector control systems, the EMAs that are used may be subject to relatively severe environmental conditions, as well as relatively high magnitude shock and vibration. It would thus be desirable to test EMAs, prior to placement into service, to ensure the EMAs have the ability to meet relatively high system frequency response and increased system slew rates, and/or to meet the environmental conditions to which they will be exposed. Unfortunately, presently available test systems do not allow one or more EMAs to be tested with a sufficient level of rigor. Nor do presently available systems provide relatively flexible mechanical and/or electrical interfaces for testing EMAs.

Hence there is a need for a system that allows one or more EMAs to be tested to ensure sufficiently high frequency response and/or high slew rate and/or with a level of rigor needed to ensure operability under relatively severe environmental conditions and/or that provide relatively flexible mechanical and/or electrical interfaces for EMAs under test. The present invention addresses one or more of these needs.

BRIEF SUMMARY

In one embodiment, and by way of example only, an electromechanical actuator test system includes an inertia simulator, a first load actuator, a second load actuator, and a test system control. The inertia simulator is adapted to be coupled to a test actuator and is configured to simulate the inertia of at least a portion of a system that is moved by the test actuator. The first load actuator is coupled to the inertia simulator, is coupled to receive first actuator commands, and is operable, in response to the first actuator commands, to supply a first load to the inertia simulator to simulate at least one or more dynamic system loads. A second load actuator is coupled to the inertia simulator, is coupled to receive second actuator commands, and is operable, in response to the second actuator commands, to supply a second load to the inertia simulator to simulate at least one or more steady-state system loads. The test system control is operable to supply the first actuator commands and the second actuator commands.

In another exemplary embodiment, an electromechanical actuator test system includes an inertia simulator, a first axis first load actuator, a first axis second load actuator, a second axis first load actuator, a second axis second load actuator, and a test system control. The inertia simulator is adapted to be coupled to a plurality of test actuators and is configured to simulate the inertia of at least a portion of a system moved by the test actuators. The first axis first load actuator is coupled to the inertia simulator, is coupled to receive first axis first actuator commands, and is operable, in response to the first axis first actuator commands, to supply a first load to the inertia simulator along a first axis. The first axis second load actuator is coupled to the inertia simulator, is coupled to receive first axis second actuator commands and is operable, in response to the first axis second actuator commands, to supply a second load to the inertia simulator along the first axis. The second axis first load actuator is coupled to the inertia simulator, is coupled to receive second axis first actuator commands, and is operable, in response to the second axis first actuator commands, to supply a third load to the inertia simulator along a second axis, the second axis perpendicular to the first axis. The second axis second load actuator is coupled to the inertia simulator, is coupled to receive second axis second actuator commands, and is operable, in response to the second axis second actuator commands, to supply a fourth load to the inertia simulator along the second axis. The test system control is operable to supply the first axis first and second actuator commands and the second axis first and second actuator commands.

Other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
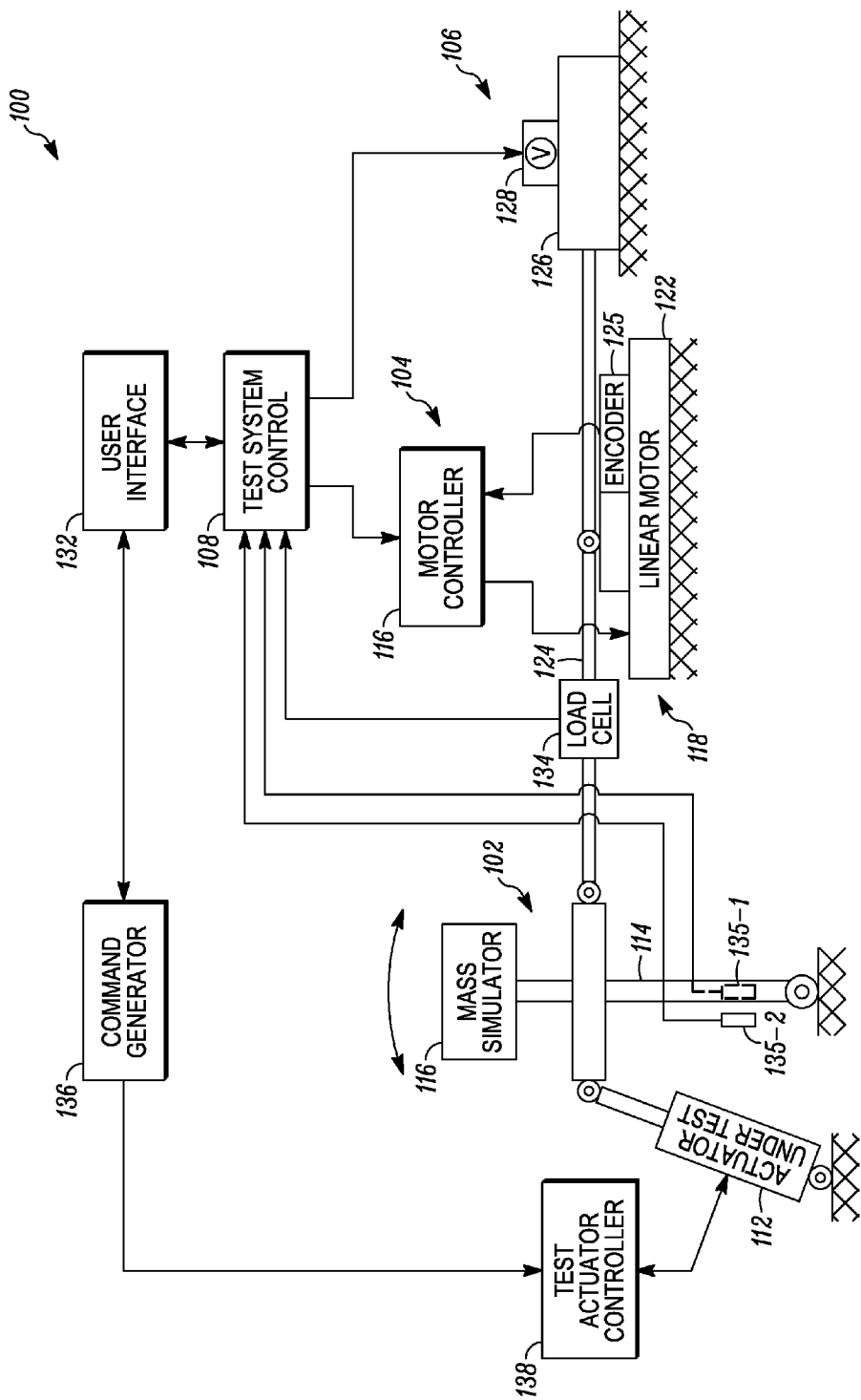
FIG. 1 depicts a functional block diagram of an exemplary embodiment of an electromechanical actuator test system.

Referring first to FIG. 1, a functional block diagram of an electromechanical actuator (EMA) test system 100 according to an exemplary embodiment is depicted. The system 100 includes an inertia simulator 102, a first load actuator 104, a second load actuator 106, and a test system control 108. Before proceeding further, it is noted that the system 100 depicted in FIG. 1 is configured for testing a single actuator. It will be appreciated that this is done merely for ease of depiction and description, and that in other embodiments the actuator system may be configured to simultaneously test a plurality of actuators. Indeed, a particular preferred embodiment that is configured to allow for simultaneously testing two actuators will be described in more detail further below.

Returning once again to the test system 100 depicted in FIG. 1, the inertia simulator 102 is configured to simulate the inertia of at least a portion of a system that may be moved by an actuator. For example, the inertia simulator 102 may simulate the inertia of a flight control surface, an attitude control device (e.g., a thrust vector propulsion nozzle), or various other systems or components. In this regard, the inertia simulator 102 is also configured to allow an actuator under test 112 (referred to herein as a test actuator) to be coupled thereto. The inertia simulator 102 may be variously configured, but in a particular preferred embodiment it is a rotationally mounted support element 114 on which a mass simulator 116 may be mounted. It will be appreciated that the particular mass of the mass simulator 116 may be varied to so that the inertia simulator 102 matches, or at least substantially matches, that of the system into which the test actuator 112 may be installed. It will additionally be appreciated that the support element 114 may, in some embodiments, be implemented as, or mounted similar to, a gimbal element, so that it may be simultaneously rotated about two perpendicular axes.

The first load actuator 104 and the second load actuator 106 are each coupled to the inertia simulator 102, and are each responsive to actuator commands to supply loads to the inertia simulator 102. More specifically, the first load actuator 104 is coupled to receive first actuator commands, and is operable, in response to the first actuator commands, to supply a first load to the inertia simulator 102 to simulate one or more system loads. The second load actuator 106 is coupled to receive second actuator commands, and is operable, in response to the second actuator commands, to supply a second load to the inertia simulator 102 to simulate one or more system loads. The first and second loads that the first and second load actuators 104, 106 supply, respectively, to the inertia simulator 102 simulate various loads, in addition to the overall system inertia, that the actuator under test 112 may experience when the actuator under test 112 is installed in an end-use system and is used to move one or more components. The first and second loads may be dynamic system loads, steady-state system loads, or both. In a particular preferred embodiment, the first load actuator 104 is configured such that the first load simulates relatively high-frequency dynamic system loads, and the second load actuator 106 is configured such that the second load simulates relatively low-frequency and/or steady-state system loads.

The first and second load actuators 104, 106 may be variously implemented to carry out the above-described functionalities. In the depicted embodiment, however, the first load actuator 104 is implemented as an electromechanical device, and the second load actuator 106 is implemented as a fluid-operated device. More specifically, at least in the depicted embodiment, the first load actuator 104 includes a motor controller 116 and an electromechanical actuator (EMA) 118. The motor controller 116 is responsive to the first actuator commands and to position feedback signals supplied from the EMA 118, to selectively energize the EMA 118. The EMA 118 is operable, upon being selectively energized, to supply the first load to the inertia simulator 102.

The EMA 118 may also be variously configured, but in the depicted embodiment it includes a linear motor 122 and a force transfer member 124. The linear motor 122 is operable, upon being selectively energized, to supply a drive force to the force transfer member 124. A suitable position sensing 125, such as an encoder or Hall effect sensors, senses the position of the linear motor 122 and supplies the position feedback signal to the motor controller 116 to, for example, properly commutate the motor 122. The force transfer member 124 is coupled between the inertia simulator 102 and the linear motor 122. The force transfer member 124 receives the drive force from the linear motor 122 and, in response, supplies the first load to the inertia simulator 102. It will be appreciated that the EMA 118 could be implemented with various other types of motors, such as any one of numerous known rotating motors, rather than with a linear motor. Moreover, the force transfer member 124 may be variously configured. Preferably, however, no matter its particular physical implementation, the first load actuator 104 is configured to exhibit a suitably rapid response to accurately reflect at least the relatively high-frequency dynamic system loads it is anticipated the actuator under test 112 will experience.

The second load actuator 106 may also be implemented as any one of numerous types of fluid-operated devices. In the depicted embodiment, the second load actuator 106 is implemented as a pneumatic device that includes a fluid-operated actuator 126 and a control valve 128. The fluid-operated actuator 126 is responsive to a control fluid to supply the second load to the inertia simulator 102. The control valve 128 is responsive to the second actuator commands to control the supply of the control fluid to the fluid-operated actuator 126. It will be appreciated that the fluid-operated actuator 126 may be configured to be responsive to either pneumatic or hydraulic fluid, but in a preferred embodiment it is a pneumatically-operated actuator. Moreover, the particular configuration of the control valve 128 may be varied.

Some examples of the loads that the first and second load actuators 104, 106 may simulate include, but are not limited to, dynamic and steady-state aerodynamic loads that may occur during various aircraft flight conditions and/or flight maneuvers, dynamic and steady-state hydrodynamic loads that may occur during various watercraft conditions and/or maneuvers, dynamic and steady-state loads that may occur during and following a particular system fault, viscous damping, misalignment loads, or various combinations thereof, just to name a few. In any case, the loads that the first and second load actuators 104, 106 simulate are controlled by the test system control 108.

The test system control 108 supplies the first actuator commands to the first load actuator 104 and the second actuator commands to the second load actuator 106. The system control 108 is also coupled to receive input data from a user interface 132 and a load signal supplied from a load sensor 134. The test system control 108 also receives, at least in the depicted embodiment, position signals from one or more position sensing devices 135. The test system control 108 is responsive to the input data, the load signal, and the position signals to supply the first and second actuator commands. It will be appreciated that the input data may be, for example, data representative of the desired forces that the first and second load actuators 104, 106 are to supply to the inertia simulator 102 during a test of the actuator under test 112. These data may be, for example, representative of a load profile that the test actuator 112 may experience when installed in an end-use system. It will additionally be appreciated that the user interface 132 may be variously implemented and configured. For example, in one particular embodiment, the user interface 132 is implemented as a general-purpose computing device, such as a portable computer. This is merely exemplary, however, and the user interface 132 may be implemented using any one of numerous devices for supplying input data to the test system control 108.

The load sensor 134 is coupled to, and is operable to sense the first and second loads supplied to, the inertia simulator 102. The load signal supplied by the load sensor 134 is thus representative of the first and second loads (e.g., the total supplied load). In the depicted embodiment, the load sensor 134 is coupled to the inertia simulator 102 via the force transfer member 124, and is illustrated as a single device. It will be appreciated, however, that this is merely exemplary, and that the load sensor 134 could be variously coupled to the inertia simulator 102, and could be implemented using a plurality of sensing devices.

The position sensing devices 135, if included, may also be variously implemented. In the depicted embodiment, a pair of position sensing devices 135-1, 135-2 is included. In the depicted embodiment, each of the position sensing devices 135-1, 135-2 is implemented using rotary encoders. It will be appreciated that this is merely exemplary, and that various other types of position sensing devices may be used. In any case, the position sensing devices 135 are each configured to sense the position of the inertia simulator 102 about an axis, and supply a position signal representative thereof to the test system control 108.

As FIG. 1 additionally depicts, the test system 100 may additionally include a command generator 136. The command generator 136 is adapted to receive input commands from, for example, a non-illustrated external system or, as depicted in FIG. 1, from the user interface 132. The input commands supplied from the external system or the user interface 132 are preferably identical to, or at least simulate, the commands supplied from a system controller that is installed in the same end-use system in which the test actuator 112 may be installed. For example, the input commands may be identical to, or at least simulate, commands supplied from a flight computer if the test actuator 112 will be installed in a flight control system or an attitude control system.

No matter the specific system or device that supplies the input commands, the command generator 136 is responsive to the input commands to at least selectively supply test actuator commands to the test actuator controller 138. The test actuator controller 138, in response to the test actuator commands, selectively energizes the test actuator 112, as it would in the end-use system, to move the test actuator 112 to a commanded position. It is noted that the command generator 136 is preferably configured to supply either analog or digital test actuator commands to the test actuator controller 138 depending, for example, on the configuration of the test actuator controller 138. In this regard, the test system 100 may include numerous and varied digital and/or analog communication interfaces and implement numerous and varied digital and/or analog communication protocols.

Figure 2:
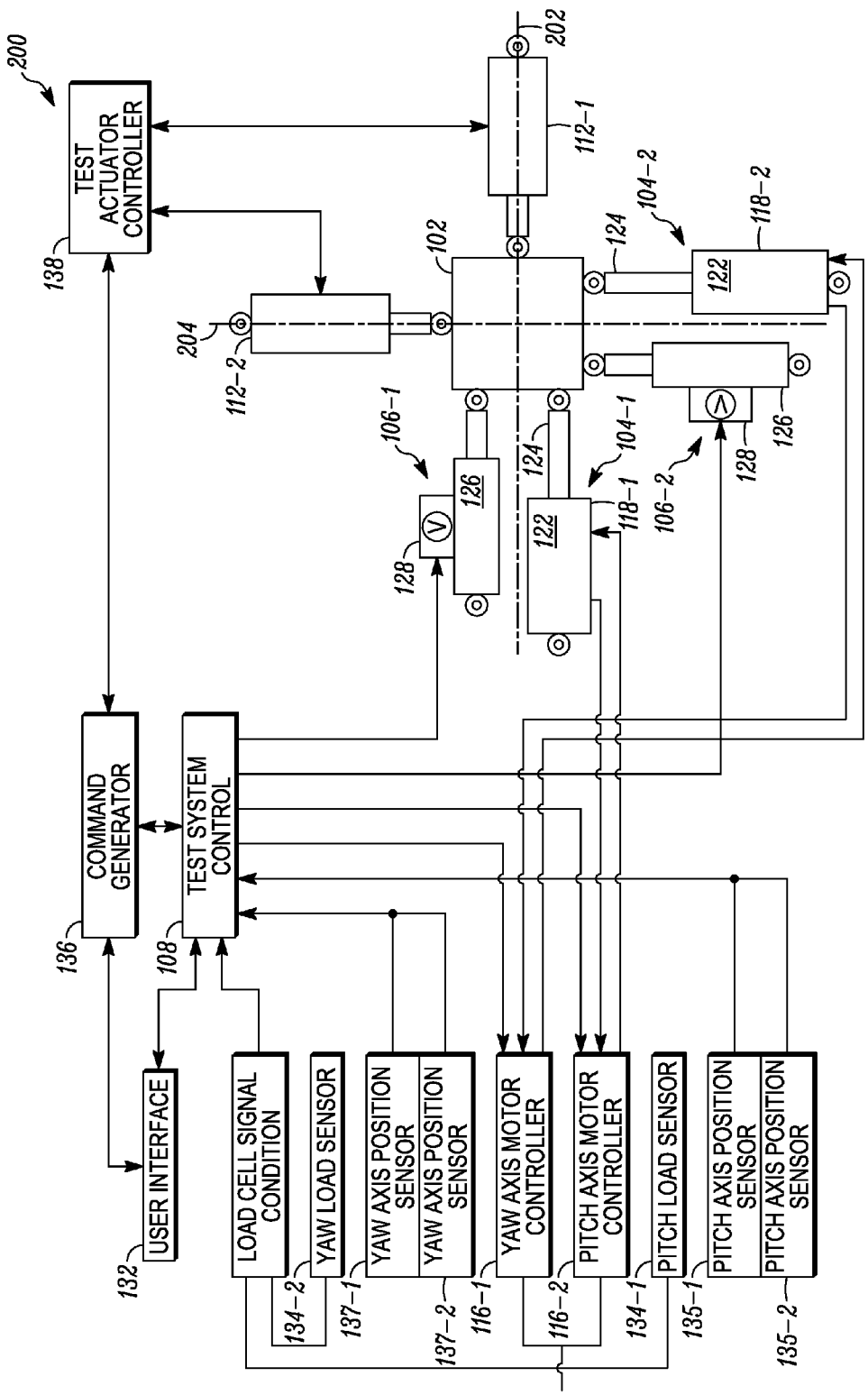
FIG. 2 depicts a functional block diagram of another exemplary embodiment of an electromechanical actuator test system.

The simplified system 100 depicted in FIG. 1 may be used to test a single actuator 112. As noted previously, an alternative test system may configured to simultaneously test a plurality of actuators. A functional block diagram of an embodiment of such a test system 200 that may be used to simultaneously test two actuators is depicted in FIG. 2. This test system 200 includes many of the same components as the system 100 of FIG. 1. In particular, the system 200 depicted in FIG. 2 includes the inertia simulator 102, the test stand control 108, the user interface 132, and the command generator 136. However, rather than including a single first load actuator and a single second load actuator, the alternative system 200 includes a pair of first load actuators 104 (e.g., 104-1, 104-2) and a pair of second load actuators 106-1, 106-2).

The first load actuators 104 are each configured similar to the first load actuator 104 of the first embodiment, and the second load actuators 106 are each configured similar to the second load actuator 106 of the first embodiment. However, each of the first and second load actuators 104, 106 in this latter embodiment are disposed to supply loads to the inertia simulator 102 along different axes 202, 204. More specifically, one of the first load actuators 104-1 supplies a first load to the inertia simulator 102 along a first axis 202, one of the second load actuators 106-1 supplies a second load to the inertia simulator 102 along the first axis 202, the other first load actuator 104-2 supplies a third load to the inertia simulator 102 along a second axis 204, and the other second load actuator 106-1 supplies a fourth load to the inertia simulator 102 along the second axis 204.

It is noted that in the depicted embodiment the first and second axes 202, 204 are perpendicular to each other. As such, the first axis 202 and the second axis 204 are conveniently referred to herein as the pitch axis 202 and the yaw axis 204, respectively. It is additionally noted that this is merely exemplary, and that the first and second axes 202, 204 need not be perpendicularly disposed. Moreover, the test system 200 could be implemented with load actuators disposed along more than two axes. Nonetheless, because the first and second axes 202, 204 in the depicted embodiment are perpendicularly disposed, the pair of first load actuators 104 are similarly referred to herein as a pitch axis first load actuator 104-1 and a yaw axis first load actuator 104-2, and the pair of second load actuators 106 are referred to herein as a pitch axis second load actuator 106-1 and a yaw axis second load actuator 106-2. Moreover, the pitch axis first load actuator 104-1 is coupled to receive and is responsive to pitch axis first actuator commands, the yaw axis first load actuator 104-2 is coupled to receive and is responsive to yaw axis first actuator commands, the pitch axis second load actuator 106-2 is coupled to receive and is responsive to pitch axis second actuator commands, and the yaw axis second load actuator 106-2 is coupled to receive and is responsive to yaw axis second actuator commands.

As FIG. 2 additionally shows, the pitch and yaw axis first load actuators 104-1, 104-2 each include a motor controller 116 (e.g., 116-1, 116-2) and an EMA 118 (e.g., 118-1, 118-2). These devices are preferably configured similar to the motor controller 116 and EMA 118 of the first embodiment, and will thus not be further described. The pitch and yaw axis second actuators 106-1, 106-2 are also preferably configured similar to the second actuator 106 of the first embodiment and will thus also not be further described.

The system 200 additionally includes at least two load sensors 134—a first axis load sensor 134-1 and a second axis load sensor 134-2. The first axis load sensor 134-1 is coupled to, and senses the first and second loads supplied to, the inertia simulator 102. The second axis load sensor 134-2 is coupled to, and sense the third and fourth loads supplied to, the inertia simulator 102. The first and second axis load sensors 134-1, 134-2 each supply load signals representative of the sensed loads to the test stand control 108. Consistently, the system additionally includes a pair of position sensors 135 associated with each axis 202, 204. In particular, the system 200 includes a pair of pitch axis position sensors 135-1, 135-2 to sense inertia simulator position along the pitch axis and supply position signals representative thereof to the test system control 108, and a pair of yaw axis position sensors 137-1, 137-2 to sense inertia simulator position along the yaw axis and supply position signals representative thereof to the test system control 108.

The test system control 108 is configured generally similar to that of the first embodiment, but rather than supplying actuator commands to only two load actuators, it supplies actuator commands to four load actuators. In this regard, the test system control 108 supplies the pitch axis first and second actuator commands to the pitch axis first and second actuators 104-1, 106-1, and supplies the yaw axis first and second actuator commands to the yaw axis first and second actuators 104-2, 106-2. The test system control 108 is also coupled to receive input data from the user interface 132, the load signals supplied from the load sensors 134, and the position signals supplied from the position sensors 135, 137. The test system control 108 is responsive to the input data, the load signals, and the position signals, to supply the actuator commands. As with the previous embodiment, the input data may be, for example, data representative of the forces that the first and second load actuators 104, 106 are to supply to the inertia simulator 102 during a test of the actuators under test 112. These data may be, for example, representative of a load profile that the test actuators 112 may experience when installed in an end-use system.

The command generator 136, similar to the previous embodiment, is adapted to receive input commands from, for example, a non-illustrated external system or from the user interface 132. As before, the input commands supplied from the external system or the user interface 132 are preferably identical to, or at least simulate, the commands supplied from a system controller that is installed in the same end-use system in which the test actuators 112 may be installed. For example, the input commands may be identical to, or at least simulate, commands supplied from a flight computer if the test actuators 112 will be installed in a flight control system or an attitude control system.

The actuator test system 200 described above allows two actuators 112 to be simultaneously tested. This advantageously allows actuators 112 that will be installed in a system that will need to simultaneously move one or more components along both of the axes 202, 204 to be accurately tested against dynamic and static loads that simulate this environment.

Figure 3:
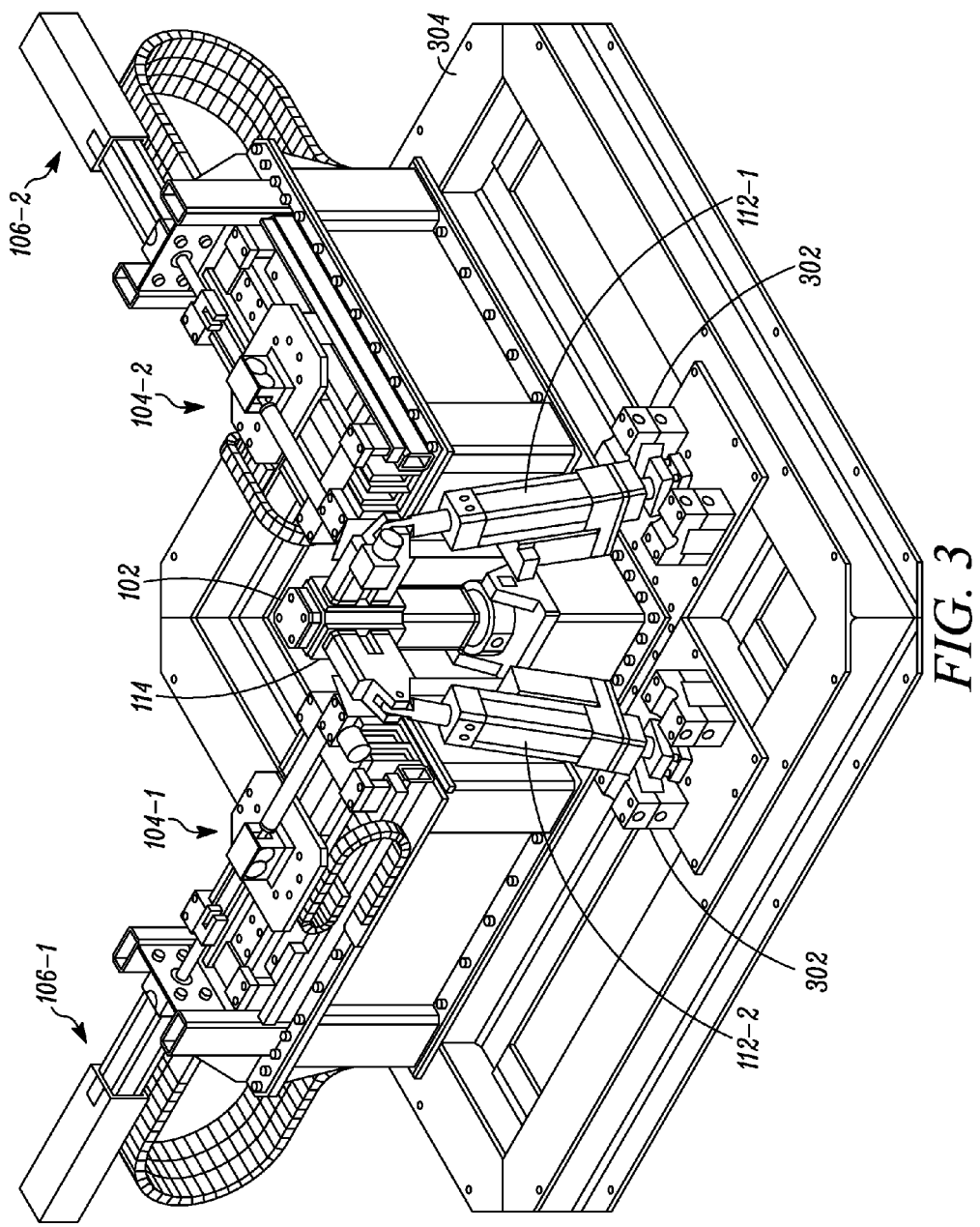
FIG. 3 depicts a plan view of an exemplary physical implementation of the exemplary system of FIG. 2.

It will be appreciated that the systems 100, 200 described above may be physically implemented in accordance with various configurations. One particular physical implementation of the system 200 that can simultaneously test two actuators 112 is depicted in FIG. 3. It is noted that this is merely exemplary of one particular configuration of a physical implementation, and that various other configurations could be implemented to carry out the functions described herein.

Before concluding, it is noted that the systems 100, 200, when physically implemented, also include suitable test actuator supports 302 (see FIG. 3) and are supported on a support structure 304. The test actuator supports 302 not only provide suitable mounting stability for the test actuators 112, but are also configured to adjust to certain system parameters and/or simulate an end-use system mounting configuration. For example, the supports 302 may be used to adjust to a desired backup stiffness for the test actuators 112, they may also be configured to adjust to different test actuator strokes and/or actuator mount angles. Moreover, the height of the inertia simulator 102 may be adjusted to accommodate different test actuator strokes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electromechanical actuator test system, comprising:
an inertia simulator adapted to be coupled to a test actuator and configured to simulate the inertia of at least a portion of a system moved by the test actuator;
an electromechanical actuator coupled to the inertia simulator and operable to be selectively energized, the electromechanical actuator operable, upon being energized, to supply a first load to the inertia simulator to simulate at least one or more dynamic system loads;
a motor controller in operable communication with the electromechanical actuator, the motor controller coupled to receive first actuator commands and operable, in response thereto, to selectively energize the electromechanical actuator;
a second load actuator coupled to the inertia simulator, the second load actuator coupled to receive second actuator commands and operable, in response thereto, to supply a second load to the inertia simulator to simulate at least one or more steady-state system loads; and
a test system control operable to supply the first actuator commands and the second actuator commands.

2. The system of claim 1, further comprising:
a command generator operable to at least selectively supply test actuator commands to a test actuator.

3. The system of claim 2, wherein the command generator is adapted to receive input commands and is operable, in response thereto, to at least selectively supply the test actuator commands.

4. The system of claim 1, wherein the inertia simulator comprises:
a rotationally disposed element including a mass mounted on an end thereof 5. The system of claim 1, wherein the electromechanical actuator comprises:
a linear motor operable to be selectively energized and, upon being energized to supply a drive force; and
a force transfer member coupled to receive the drive force from the linear motor and operable, upon receipt thereof, to supply the first load to the inertia simulator.

6. The system of claim 1, wherein the second load actuator comprises:
a fluid-operated actuator responsive to control fluid to supply the second load to the inertia simulator; and
a control valve in operable communication with the test system control, the control valve responsive to the second actuator commands to control the supply of control fluid to the fluid-operated actuator.

7. The system of claim 6, wherein the fluid-operated actuator comprises a pneumatic actuator.

8. The system of claim 1, further comprising:
a sensor coupled to the inertia simulator, the sensor operable to sense the first and second loads and supply a load signal representative thereof to the test system control.

9. The system of claim 8, wherein the test system control is coupled to receive the load signal from the sensor and is responsive thereto to supply the first actuator commands and the second actuator commands.

10. An electromechanical actuator test system, comprising:
an inertia simulator adapted to be coupled to a plurality of test actuators and configured to simulate the inertia of at least a portion of a system moved by the test actuators;

a first axis first load actuator coupled to the inertia simulator, the first axis first load actuator coupled to receive first axis first actuator commands and operable, in response thereto, to supply a first load to the inertia simulator along a first axis;

a first axis second load actuator coupled to the inertia simulator, the first axis second load actuator coupled to receive first axis second actuator commands and operable, in response thereto, to supply a second load to the inertia simulator along the first axis;

a second axis first load actuator coupled to the inertia simulator, the second axis first load actuator coupled to receive second axis first actuator commands and operable, in response thereto, to supply a third load to the inertia simulator along a second axis, the second axis perpendicular to the first axis;

a second axis second load actuator coupled to the inertia simulator, the second axis second load actuator coupled to receive second axis second actuator commands and operable, in response thereto, to supply a fourth load to the inertia simulator along the second axis; and a test system control operable to supply the first axis first and second actuator commands and the second axis first and second actuator commands.

11. The system of claim 10, further comprising:

a command generator adapted to receive input commands and operable, in response thereto, to at least selectively supply test actuator commands to a plurality of test actuators.

12. The system of claim 10, wherein the first and second axis first load actuators each comprise:

an electromechanical actuator operable to be selectively energized and, upon being energized, to supply a load to the inertia simulator; and a motor controller in operable communication with the test system control and the electromechanical actuator, the motor controller responsive to actuator commands to selectively energize the electromechanical actuator.

13. The system of claim 12, wherein each of the electromechanical actuators comprises:

a linear motor operable to be selectively energized and ,upon being energized to supply a drive force; and a force transfer member coupled to receive the drive force from the linear motor and operable, upon receipt thereof, to supply the first load to the inertia simulator.

14. The system of claim 10, wherein the inertia simulator comprises:

a gimbal element including a mass mounted on an end thereof

15. The system of claim 10, wherein the first and second axis second load actuators each comprise:

a fluid-operated actuator responsive to control fluid to supply the second load to the inertia simulator; and a control valve in operable communication with the test system control, the control valve responsive to the second actuator commands to control the supply of control fluid to the fluid-operated actuator.

16. The system of claim 10, further comprising:

a first axis sensor coupled to the inertia simulator, the first sensor operable to sense the first and second loads and supply a load signal representative thereof to the test system control; and a second axis sensor coupled to the inertia simulator, the second axis sensor operable to sense the third and fourth loads and supply a load signal representative thereof to the test system control.

17. The system of claim 16, wherein the test system control is coupled to receive the load signals from the first and second axis sensors and is responsive thereto to supply the first axis first and second actuator commands and the second axis first and second actuator commands.

18. The system of claim 10, further comprising:

a support structure having mounted thereon at least the inertia simulator, the first axis first load actuator, the first axis second actuator, the second axis first load actuator, and the second axis second actuator; and a plurality of test actuator supports mounted on the support structure, each test actuator support adapted to couple to a test actuator, each test actuator support further adapted to adjust at least a back stiffness supplied thereby to a test actuator.

19. An electromechanical actuator test system, comprising:

an inertia simulator adapted to be coupled to a test actuator and configured to simulate the inertia of at least a portion of a system moved by the test actuator;

a first load actuator coupled to the inertia simulator, the first load actuator coupled to receive first actuator commands and operable, in response thereto, to supply a first load to the inertia simulator to simulate at least one or more dynamic system loads;

a fluid-operated actuator coupled to the inertia simulator and responsive to control fluid to supply a second load to the inertia simulator to simulate at least one or more steady-state system loads;

a control valve coupled to receive second actuator commands and operable, in response thereto, to control the supply of control fluid to the fluid-operated actuator; and a test system control operable to supply the first actuator commands and the second actuator commands.

20. The system of claim 19, wherein the first load actuator comprises:

an electromechanical actuator operable to be selectively energized and, upon being energized, to supply the first load to the inertia simulator; and a motor controller in operable communication with the test system control and the electromechanical actuator, the motor controller responsive to the first actuator commands to selectively energize the electromechanical actuator.

* * * * *